US011218390B2

United States Patent
Carter et al.

(10) Patent No.: US 11,218,390 B2
(45) Date of Patent: Jan. 4, 2022

(54) FILTERING CONTENT BASED ON USER MOBILE NETWORK AND DATA-PLAN

(71) Applicant: Google LLC, Mountain View, CA (US)

(72) Inventors: Bernadette Alexia Carter, Santa Clara, CA (US); Daniel Frederick Meyer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 196 days.

(21) Appl. No.: 16/437,818

(22) Filed: Jun. 11, 2019

(65) Prior Publication Data

US 2019/0327157 A1    Oct. 24, 2019

Related U.S. Application Data

(63) Continuation of application No. 14/830,252, filed on Aug. 19, 2015, now Pat. No. 10,361,936.

(51) Int. Cl.
*G06F 16/335*   (2019.01)
*H04L 12/26*   (2006.01)
*G06F 16/2457*   (2019.01)
*G06Q 30/02*   (2012.01)
*H04L 12/927*   (2013.01)

(52) U.S. Cl.
CPC .... *H04L 43/0805* (2013.01); *G06F 16/24578* (2019.01); *G06Q 30/02* (2013.01); *H04L 47/805* (2013.01)

(58) Field of Classification Search
CPC .............. H04L 43/0805; H04L 47/805; G06F 16/24578; G06Q 30/02
USPC ........................................................ 707/754
See application file for complete search history.

(56) References Cited

U.S. PATENT DOCUMENTS

| 6,138,156 A | 10/2000 | Fletcher |
| 7,069,014 B1 | 6/2006 | Thenthiruperai et al. |
| 8,271,336 B2 | 9/2012 | Mikurak |
| 9,183,259 B1 * | 11/2015 | Marra ................. G06F 16/9535 |
| 9,332,291 B1 | 5/2016 | Young-Lai |

(Continued)

FOREIGN PATENT DOCUMENTS

| CN | 101360045 | 2/2009 |
| CN | 101847158 | 9/2010 |

(Continued)

OTHER PUBLICATIONS

CIITRIX: "White Paper I Applying Adaptive Traffic Management: Improving Network Capacity and the Subscriber Experience," Aug. 1, 2013, retrieved from internet: https://www.citrix.com/content/dam/citrix/en_us/documents/products-solutions/applying-adaptive-traffic-management-improving-network-capacity-and-the-subscriber-experience. pdf [retrieved on Sep. 6, 2016], 18 pgs.

(Continued)

*Primary Examiner* — Hanh B Thai
(74) *Attorney, Agent, or Firm* — Fish & Richardson P.C.

(57) ABSTRACT

A system comprising a processor and a memory storing instructions that, when executed, cause the system to receive a content request from a client device of a user; determine level of network availability on the client device and data plan availability associated with the user; determine one or more content filtering factors to filter the content for display to the user; filter the content based on the one or more filtering factors, the level of network availability, and the data plan availability; and provide filtered content for display on the client device of the user.

14 Claims, 9 Drawing Sheets

(56) References Cited

U.S. PATENT DOCUMENTS

| | | | |
|---|---|---|---|
| 2001/0056362 A1* | 12/2001 | Hanagan | H04M 15/51 705/7.11 |
| 2002/0075844 A1 | 6/2002 | Hagen | |
| 2002/0099829 A1 | 7/2002 | Richards | |
| 2003/0110213 A1 | 6/2003 | Munetsugu et al. | |
| 2003/0154193 A1 | 8/2003 | Rosenblum | |
| 2003/0169749 A1 | 9/2003 | Huang | |
| 2004/0001498 A1 | 1/2004 | Chen | |
| 2004/0073596 A1* | 4/2004 | Kloninger | H04L 67/16 709/200 |
| 2004/0128125 A1* | 7/2004 | Makinen | H04L 1/0014 704/219 |
| 2005/0071757 A1 | 3/2005 | Ehrich | |
| 2006/0010497 A1 | 1/2006 | O'Brien | |
| 2006/0235730 A1* | 10/2006 | Politano | G06Q 10/10 705/4 |
| 2006/0235731 A1* | 10/2006 | Gupta | G06Q 40/08 705/4 |
| 2006/0235737 A1* | 10/2006 | Fleurant | G06Q 10/10 705/7.26 |
| 2006/0235738 A1* | 10/2006 | Doyle | G06F 16/2343 705/7.15 |
| 2006/0265489 A1* | 11/2006 | Moore | H04L 69/40 709/223 |
| 2007/0061266 A1* | 3/2007 | Moore | G16H 40/20 705/51 |
| 2007/0088966 A1* | 4/2007 | Price | G06F 1/3203 713/324 |
| 2007/0143153 A1 | 6/2007 | Ashby | |
| 2007/0001613 A1 | 7/2007 | Melinger | |
| 2008/0037477 A1 | 2/2008 | Axelsson | |
| 2009/0163183 A1* | 6/2009 | O'Donoghue | G06Q 30/02 455/414.1 |
| 2010/0265861 A1* | 10/2010 | He | H04L 47/30 370/311 |
| 2010/0312464 A1 | 12/2010 | Fitzgerald | |
| 2011/0072107 A1 | 3/2011 | Gutta | |
| 2011/0078237 A1 | 3/2011 | Nakamura | |
| 2013/0250129 A1 | 9/2013 | Patil et al. | |
| 2013/0268327 A1* | 10/2013 | Nagamatsu | G06Q 10/0631 705/7.41 |
| 2014/0029615 A1* | 1/2014 | Baldwin | H04L 67/2828 370/392 |
| 2014/0074923 A1 | 3/2014 | Vasudevan | |
| 2014/0136686 A1 | 5/2014 | Tsai | |
| 2014/0220927 A1 | 8/2014 | Girard | |
| 2014/0223265 A1* | 8/2014 | Lusted | H04L 1/0017 714/776 |
| 2014/0244670 A1 | 8/2014 | Wyatt | |
| 2014/0258813 A1 | 9/2014 | Lusted et al. | |
| 2014/0297862 A1* | 10/2014 | Qureshi | H04L 41/0816 709/225 |
| 2015/0170072 A1 | 6/2015 | Grant | |
| 2015/0237055 A1* | 8/2015 | Canoy | H04W 12/088 726/1 |
| 2015/0339941 A1* | 11/2015 | Lu | G09B 5/12 434/309 |
| 2016/0006122 A1* | 1/2016 | Seol | H04B 7/0408 342/372 |
| 2016/0021229 A1* | 1/2016 | Lewis | H04R 25/554 455/420 |
| 2016/0247078 A1 | 8/2016 | Gaw | |
| 2016/0371045 A1 | 12/2016 | Munn | |
| 2017/0141875 A1* | 5/2017 | Eliaz | H04L 1/0003 |
| 2018/0324060 A1* | 11/2018 | Chaponniere | H04L 69/22 |

FOREIGN PATENT DOCUMENTS

| | | |
|---|---|---|
| CN | 101888501 | 11/2010 |
| CN | 102118388 | 7/2011 |
| CN | 102208086 | 10/2011 |
| CN | 102365554 | 2/2012 |
| CN | 102646109 | 8/2012 |
| CN | 102685242 | 9/2012 |
| CN | 103038652 | 4/2013 |
| JP | 2003-233597 | 8/2003 |
| JP | 2010-055391 | 3/2010 |
| JP | 2015-060358 | 3/2015 |

OTHER PUBLICATIONS

International Search Report and Written Opinion of the International Search Authority for International Application No. PCT/US2016/038202, dated Sep. 19, 2016, 12 pgs.

CN Office Action in Chinese Application No. 201680030611.8, dated Oct. 9, 2020, 18 pages (with English translation).

EP Summons to Attend Oral Proceedings in European Application No. 16736651.7-1217 /3338235, dated Jul. 22, 2019, 14 pages.

IN Office Action in Indian Application No. 201747043184, dated Jul. 31, 2020, 7 pages (with English translation).

CN Office Action in Chinese Application No. 201680030611.8, dated May 7, 2021, 7 pages (with English translation).

* cited by examiner

FILTERING CONTENT BASED ON USER MOBILE NETWORK AND DATA-PLAN

CROSS-REFERENCE TO RELATED APPLICATION

This application is a continuation of U.S. application Ser. No. 14/830,252, filed Aug. 19, 2015, the contents of which are incorporated by reference herein.

BACKGROUND

The disclosure relates to filtering content based on user mobile network and data-plan. Specifically, the disclosure relates to filtering the content for display to a user based on quality of network the user's mobile device is on and amount of data-plan left with the user.

If a user is using a mobile application (e.g., a social network application) and is on a poor network connection (e.g., 1 bar edge network), his/her experience can be very frustrating if content requested by the user is delivered in low quality or is not interesting data. Some of the problems associated with a poor network connection are 1) retrieving a normal number of social posts to load at start may take a long time, 2) once the posts are loaded, the content may not be interesting, consequently the user wasted time waiting for the load, and 3) even if the content is interesting but otherwise includes a lot of media items (e.g., photos, videos, etc.), the user may find it frustrating or impossible to download the media items because of his/her poor network connection, again wasting the user's time.

Presently, there is no way for a user to set preferences for what level of content quality or characteristics that must be met when using the user's data plan or have a content providing server automatically take that into consideration before sending back content to the user for display. In other words, the user can't tell an application that "data and/or network bandwidth are tight—only give the best content". There currently isn't a solution that takes in a combination of the user's network bandwidth availability, amount of data left in the user's data plan, and the quality of content to determine if only content of high relevance to the user should be rendered at a time of poor network connection and/or low data plan availability and the rest should be queued up for another time when the network and data plan constraints do not exist.

SUMMARY

According to one innovative aspect of the subject matter in this disclosure, a system having a processor and a memory storing instructions that, when executed, cause the system to receive a content request from a client device of a user; determine level of network availability on the client device and data plan availability associated with the user; determine one or more content filtering factors to filter the content for display to the user; filter the content based on the one or more filtering factors, the level of network availability, and the data plan availability; and provide filtered content for display on the client device of the user.

In general, another innovative aspect of the subject matter described in this disclosure may be implemented in methods that include: receiving, using one or more computing devices, a content request from a client device of a user; determining, using the one or more computing devices, level of network availability on the client device and data plan availability associated with the user; determining, using the one or more computing devices, one or more content filtering factors to filter the content for display to the user; filtering, using the one or more computing devices, the content based on the one or more filtering factors, the level of network availability, and the data plan availability; and providing, using the one or more computing devices, filtered content for display on the client device of the user.

Other implementations of one or more of these aspects include corresponding systems, apparatus, and computer programs, configured to perform the actions of the methods, encoded on computer storage devices.

These and other implementations may each optionally include one or more of the following features.

For instance, the operations further include: sending, using the one or more computing devices, a notification to the client device of the user, the notification notifying the user of one or more of the level of network availability and the data plan availability and asking the user whether to filter the content The operations further include receiving from the client device of the user, using the one or more computing devices, user's approval to filter the content; and filtering, using the one or more computing devices, the content responsive to receiving the user's approval to filter the content. The content includes a set of items and filtering the content based on the one or more filtering factors, the level of network availability, and the data plan availability includes determining, using the one or more computing devices, a relevance of each item based on the one or more filtering factors, assigning, using the one or more computing devices, an inclusion score for the item based on the relevance of the item and one or more of the level of network availability and the data plan availability, filtering, using the one or more computing devices, the content by removing the item from the content responsive to determining that the inclusion score for the item is less than a certain threshold. The operations further include determining, using the one or more computing devices, the level of network availability as poor and notifying, using the one or more computing devices, the user of the poor network availability and providing an option to the user of whether to filter the content based on the poor network availability. The operations further include receiving, using the one or more computing devices, user's approval to the option of filtering the content; filtering, using the one or more computing devices, the content by excluding high quality multimedia items from the content and prioritizing items in the content that are text-based and include small size images; automatically providing, using the one or more computing devices, the high quality multimedia items that were filtered out from the content for display to the user responsive to determining the level of network availability as improved; and that filtering the content includes one or more of excluding one or more items from the content and degrading quality of the content.

For instance, the features may include that the one or more filtering factors include user interests, user content quality preferences, user's current location or environment of content access, user's affinity to other users to which the content is related, type and size of the content, user's prior level of engagement with the content, user's calendar indicating one or more events related to the content at a particular time, and user's normal usage of data plan; and that the content includes one or more of social network posts, news articles, videos, texts, audio clips, and images.

These implementations are particularly advantageous in a number of respects. For instance, the technology described herein can allow users to use their limited data plan for content of higher quality and content that is easier for the users to consume. This is advantageous as the users will not have to miss out on any important content for fear of going over data plan usage or waste their time and data plan for content of lower or of no interest to these users. The technology further allows a user to set preferences (e.g., weights, settings, etc.) on what content should be filtered or rendered when on poor network or minimal data plan availability. Also, during a condition when there is poor network or minimal data plan availability, the technology provides a user with a notification that notifies the user that the quality may not be high and gives the user an option to see content of high quality when environment conditions (e.g., network quality, data plan availability) are better before wasting significantly more data.

It should be understood that language used in the present disclosure has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

This disclosure describes technology for filtering content for display to a user based on level of network and data plan availability. In particular, the technology described herein filters the content based on a combination of one or more of 1) quality of network the user is on (e.g., 1 bar Edge network vs. high quality Wi-Fi), 2) amount of data plan left for the current payment cycle (e.g., 10 MB left before overage and 1 day left for the current cycle vs 10 MB left before overage and 10 days left for the current cycle), 3) normal data plan usage of the user (e.g., user typically uses 10 MB a day vs user typically uses 10 MB a week), 4) type of item in the content (e.g., short text post, long text post, post with only a video, post with a video and some meaningful text, etc.), 5) quality of content based on the user's interest, location, and/or environment, 6) quality of content based on user's social graph and affinity to different nodes or users in the social graph, and 7) time sensitivity or calendar applicability (e.g., is the content useful for someone to know at a particular time). It should be understood that the technology is not limited to filter content based on just these factors or criteria listed herein and that numerous other factors for filtering content are also possible and contemplated.

Figure 1:
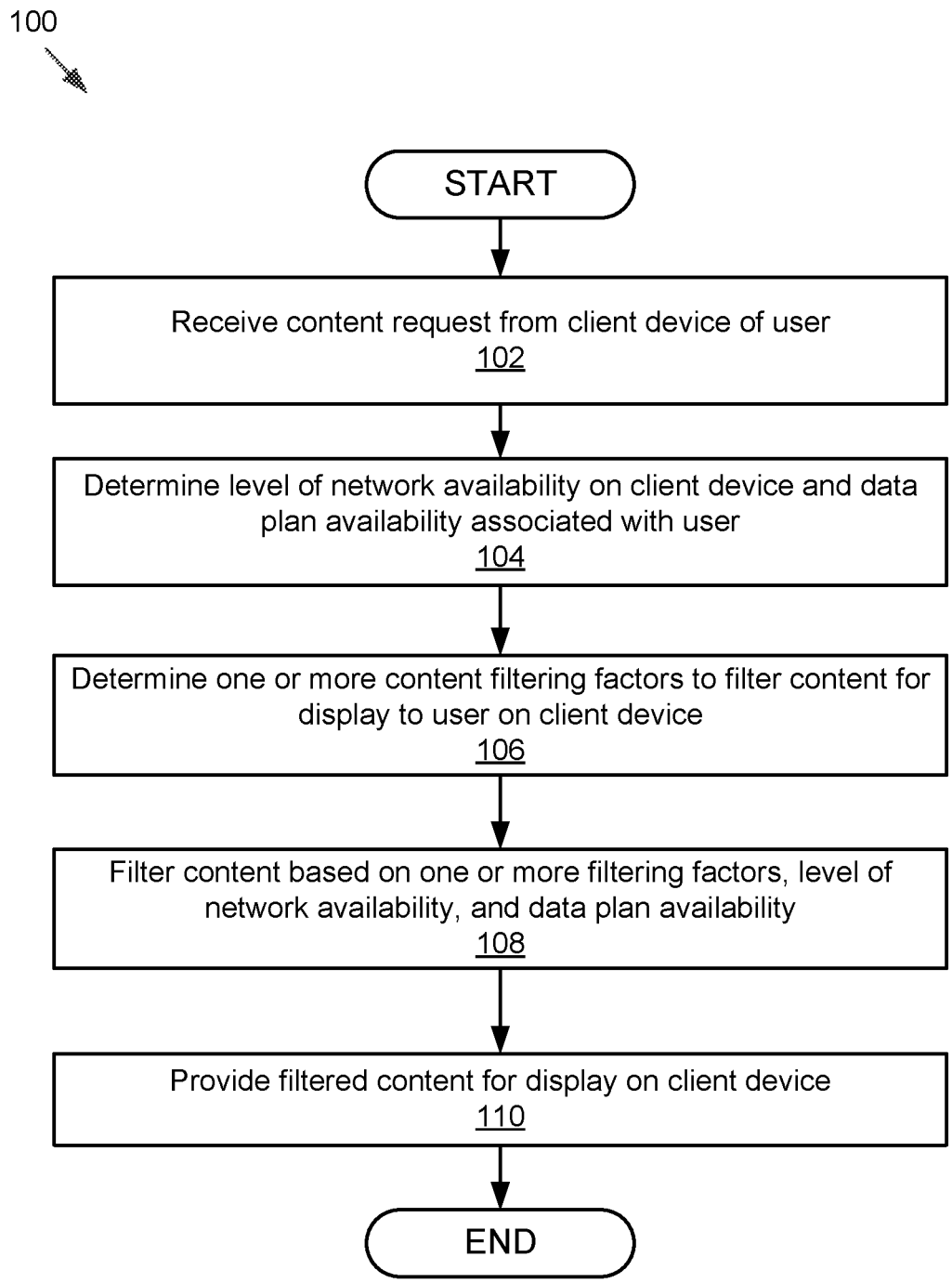
FIG. 1 is a flowchart of an example method for filtering content based on network and data plan availability.

FIG. 1 is a flowchart of an example method 100 for filtering content based on network and data plan availability. The method 100 begins by receiving 102 a content request from a client device of a user. For instance, the user interface module 410 may receive the request and send it to the content filtering engine 436 for processing that request thereon. The method 100 may then determine 104 a level of network availability on the client device and data plan availability associated with the user. For instance, the network quality and data plan module 504 of the content filtering engine 436 may cooperate with the network quality and data plan analyzer 412 of the client application 408 to determine the network quality status (e.g., whether network quality is good/poor) and data plan usage statistics (e.g., amount of data plan left with user, days left before current billing cycle period ends, etc.).

The method 100 continues by determining 106 one or more content filtering factors to filter the content for display to the user on the client device. The one or more filtering factors may include, for example and without limitation, average data plan usage of user, quality of content based on user interests and social graph of the user, time sensitivity of the content, location of client device from where the request for content was made, etc. In some implementations, determination of the one or more filtering factors may be performed by the content relevance determination and scoring module 506, as discussed elsewhere herein.

Once the level of network availability, the data plan availability, and the one or more filtering factors are determined as discussed above, the method 100 may filter 108 the content based on the level of network availability, the data plan availability, and the one or more filtering factors. For instance, the filtering module 508 may filter the content by excluding one or more items from the content based on the one or more filtering factors and the level of network and data plan availability. Responsive to filtering the content in block 108, the method 100 may then provide 110 filtered content for display on the client device of the user. For instance, the filtering module 508 may send filtered content to the content provisioning module 510, which may then cooperate with the user interface module 410 to display the filtered content on the client device of the user.

Figure 2A:
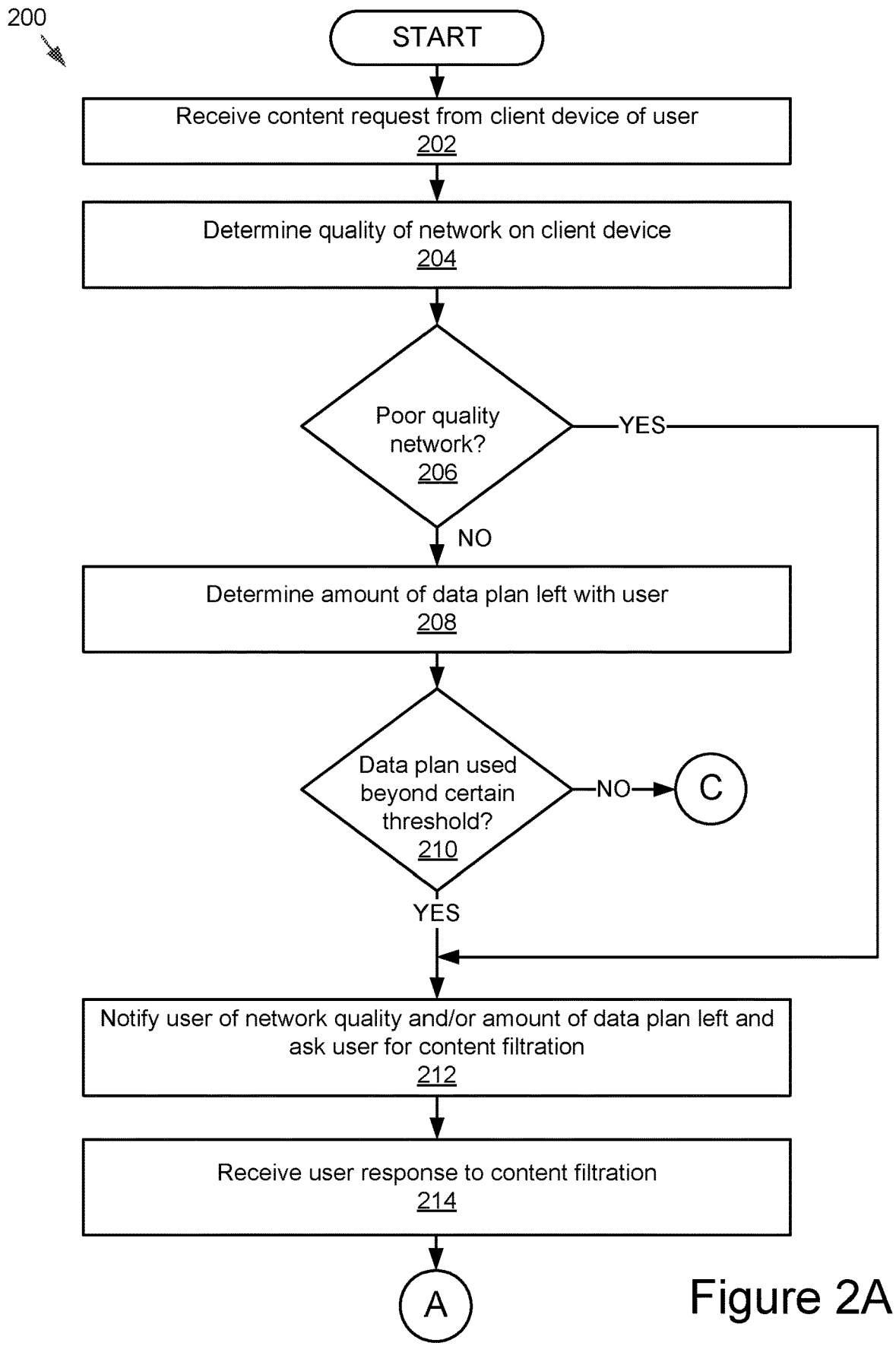
FIGS. 2A-2C are block diagrams of another example method for filtering content based on network and data plan availability.
Figure 2B:
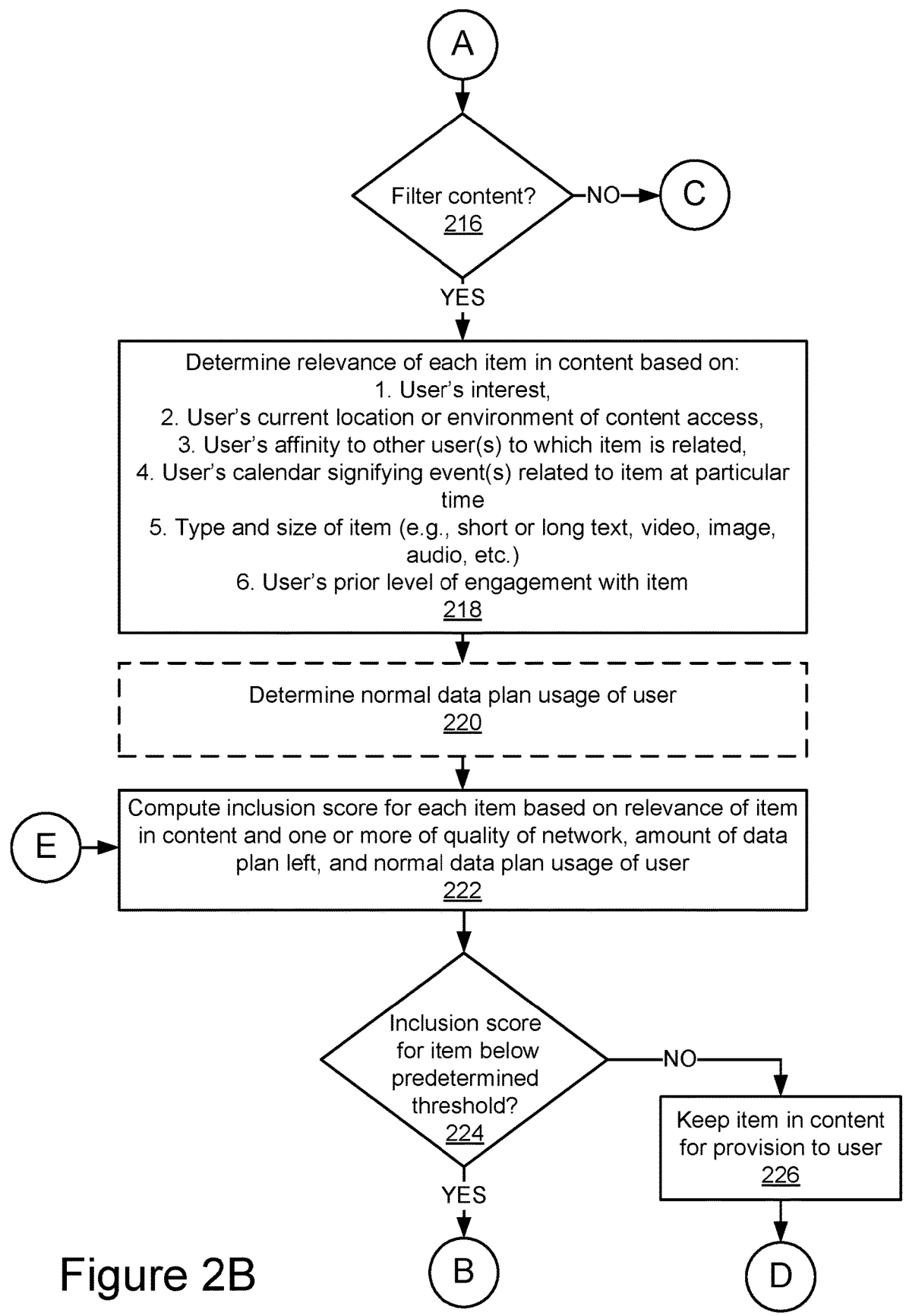
Figure 2C:
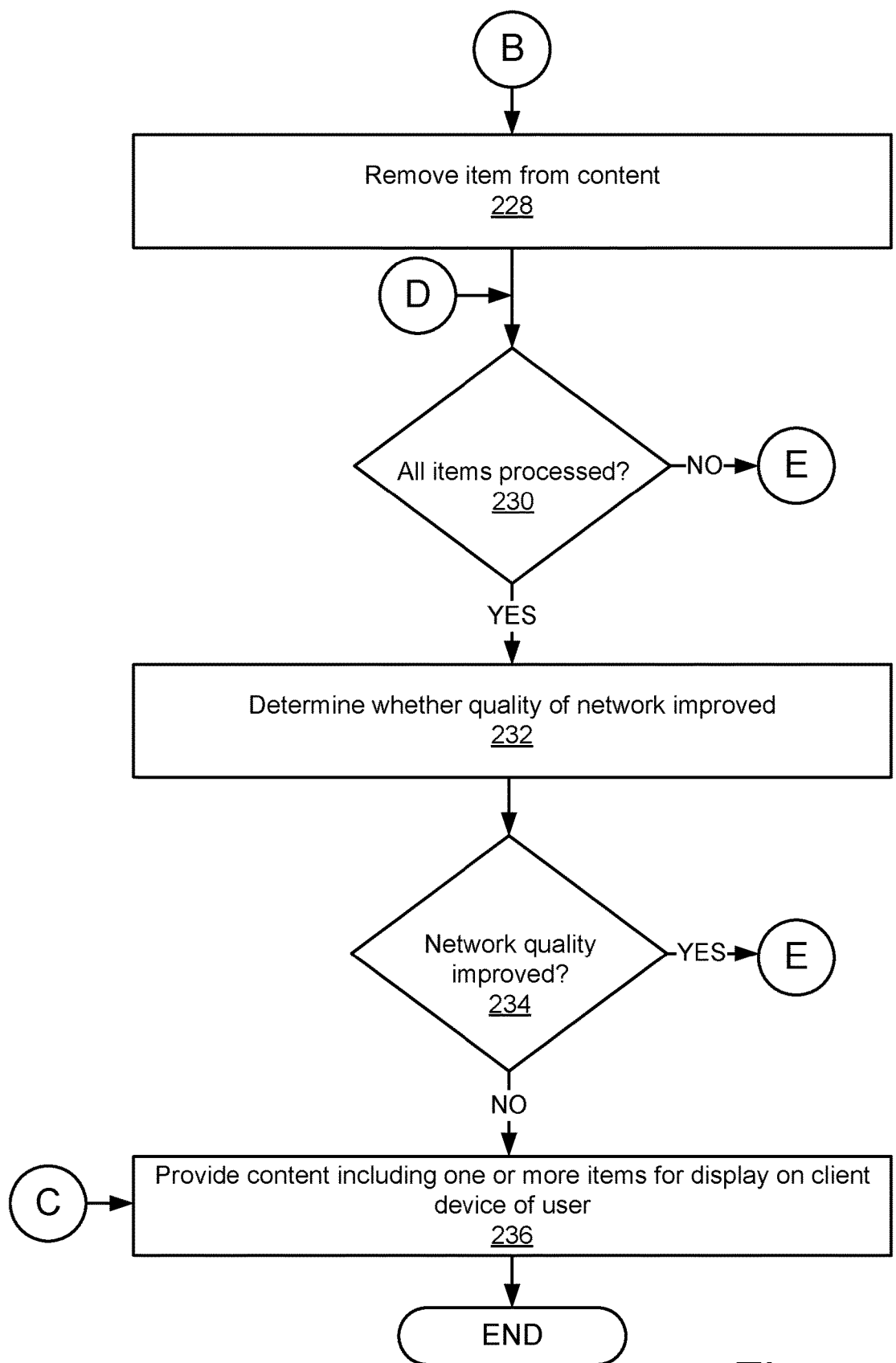

FIGS. 2A-2C are block diagrams of another example method 200 for filtering content based on network and data plan availability. The method 200 begins by receiving 202 a content request from a client device associated with a user. The method 200 may determine 204 quality of network on the client device. For instance, the network quality and data plan analyzer 412, the network quality and data plan module 504, and/or a combination of the two may perform the operation in block 204.

Responsive to determining the quality of network, the method 200 may determine in block 206 whether the network is a poor quality network. If the result of determination in block 206 is negative, the method 200 may proceed to determine 208 amount of data plan left with the user and determine in block 210 whether the data plan is used beyond a certain threshold. For example, a user may have a 500 MB data plan out of which 400 MB has been used and there are still 10 days left before the data plan availability is reset to 500 MB. The certain threshold in this example can be 450 MB.

If the result of the determination in block 210 is negative, then the method 200 may simply proceed to block 236 (see FIG. 2C) to provide content including one or more items for display on the client device of the user. For instance, if the network quality and data plan module 504 determines neither of the level of network and data plan availability to be low or poor, it may signal the content provisioning module 510 to retrieve the requested content and send it to the user interface module 410 for display.

Returning back to block 206, if the network quality and data plan module 504 determines the network quality as poor or in block 210, the data plan usage to be used beyond the certain threshold, then the method 200 may proceed to block 212 to notify the user of the network quality and/or the amount of data plan left with the user and ask the user whether content should be filtered based thereon. Next, the method 200 receives 214 a user response to content filtration and based on the user response, the method 200 may determine in block 216 (see FIG. 2B) whether to filter the content. For instance, the network quality and data plan module 504 may receive, via the controller 502, the user response from the user interface module 410 as discussed elsewhere herein. If the result of the determination in block 216 is negative, the method 200 may simply proceed to block 236 (see FIG. 2C) to provide content including one or more items for display on the client device of the user.

On the other hand, if the result of the determination in block 216 is positive, the method 200 may determine 218 a relevance of each item in the content based on 1) user's interest, 2) user's current location or environment of content access, 3) user's affinity to other one or more users to which the item is related, 4) user's calendar signifying one or more events related to the item at a particular time, 5) type and size of the item (e.g., short or long text, video, image, audio, etc.), and 6) user's prior level of engagement with the item. It should be understood that determining suitability of an item is not limited to be based on these factors or criteria and that various other factors are also possible and contemplated.

Next, the method 200 may determine 220 normal data plan usage of the user. The block 220 is depicted in dotted lines to indicate that the operation performed in block 220 is optional and may not be performed at all times during the operation of the method 200. The method 200 may then compute 222 an inclusion score for each item in the content based on the relevance of the item determined in block 218 and one or more of quality of network (determined in block 204), amount of data plan left with the user (determined in block 208), and the normal data plan usage of user (determined in block 220). In some implementations, the operations in the blocks 218-222 are performed by the content relevance determination and scoring module 506 as discussed elsewhere herein.

Responsive to computing the inclusion score for each item, the method 200 may determine in block 224 whether the score for the item is below a predetermined threshold. For instance, the filtering module 508 may receive inclusion scores associated with one or more items in the content from the content relevance determination and scoring module 506 and then compare an inclusion score associated with each item with the pre-determined threshold. If the filtering module 508 determines the inclusion score for the item above the threshold, the method 200 may keep 226 the item in the content for provision to the user and then proceed to block 230 (see FIG. 2C) to perform subsequent operations thereon. If on the other hand, the filtering module 508 determines the inclusion for the item to be below the pre-determined threshold, then the method 400 may proceed to block 228 (see FIG. 2C) to remove that item from the content.

Next, the method 200 may determine in block 230 whether all the items in the content are processed. If one or more items are determined to not be processed by the filtering module 508, then the method 200 may return to block 222 (see FIG. 2B) to compute an inclusion score for each of the one or more items and perform subsequent operations, as discussed above. If on the other hand, all the items are determined to be processed by the filtering module 508, the method 200 may then determine 232 whether the quality of the network has been improved since the last quality check.

If the network quality is determined to be improved in block 234, the method 200 may return to block 222 (see FIG. 2B) to compute an inclusion score for each item in the content again and perform subsequent operations, as discussed above. Performing the network quality check again is advantageous as it may allow one or more excluded items to be incorporated in the content provision to the user if the network quality or conditions are determined to have improved. If on the other hand, the result of the determination in block 234 is negative, then the method 200 may proceed to block 236 to provide content including one or more items for display on the client device of the user. For instance, the content provisioning module 510 may send, via the controller 502, the content including the one or more items to the user interface module 410 for rendering or display on the client device of the user who requested for the content.

Figure 3A:
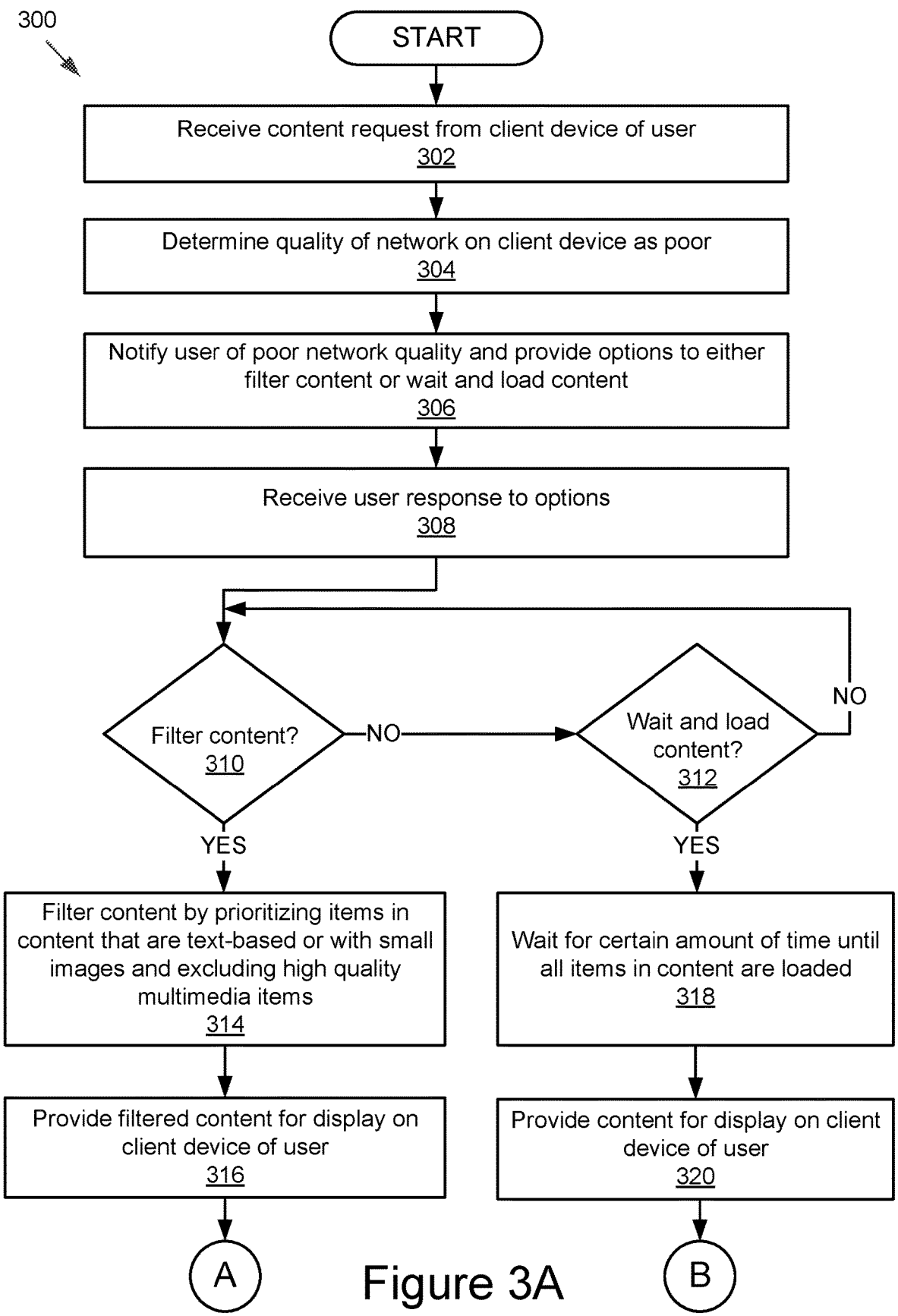
FIGS. 3A and 3B are block diagrams of an example method for notifying a user of poor network quality and providing the user with options of filtering content or waiting and loading the content.
Figure 3B:
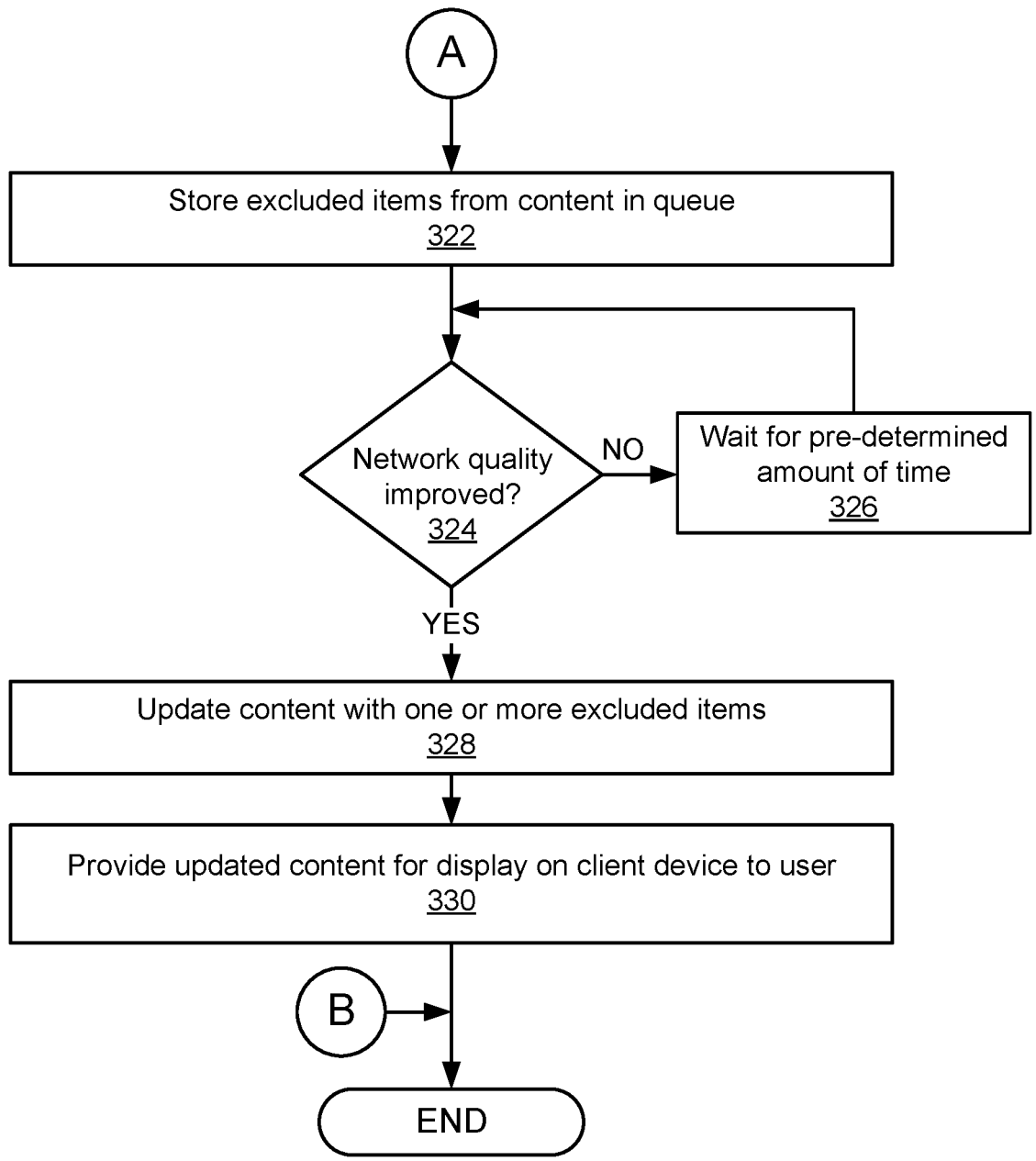

FIGS. 3A and 3B are block diagrams of an example method 300 for notifying a user of poor network quality and providing the user with options of filtering content or waiting and loading the content. The method 300 begins by receiving 302 a content request from a client device of a user. The method 300 may determine 304 a quality of network on which the client device is on as poor. For instance, the network quality and data plan module 504 of the content filtering engine 436 may perform this operation in cooperation with the network quality and data plan analyzer 412 of the client application 408 as discussed elsewhere herein.

Responsive to determining the quality of network on the client device as poor, the method 300 may notify 306 the user of poor network quality and provide options to the user indicating whether to filter out the content or just wait and load the content. For instance, the network quality and data plan module 504, via the controller 502, may send the notification to the user interface module 410, which may then display it on the client device of the user. The method 300 may then receive 308 a user response to the options provided in block 306.

Once the user response is received, the method 300 may determine in block 310 whether the user response is to filter out the content. If the result of the determination is negative, the method 300 proceed to block 312 to determine whether the user response is to wait and just load the entire content. If the result is negative, the method 300 may continue determining an option chosen by the user based on the user response. Otherwise, the method 300 may wait 318 for a certain amount of time until all of the items in the content are loaded based on the current network bandwidth and then provide 320 the content for display on the client of the user. For example, a user may be willing to wait for some time for social posts on user's favorite sports team posted by close friends of the user.

Returning back to block 310, if the user response is to filter the content, the method 300 may proceed to block 314 to filter the content by prioritizing items in the content that are text-based or with small images and by excluding high quality multimedia items for later provision when network quality is better. For instance, the content relevance determination and scoring module 506 may assign a higher score to an item in the content if it includes only text or small images and not high quality or multimedia objects (e.g., video, audio, etc.), and the filtering module 508 during its filtering process may give a higher priority to items for inclusion in the content provision that are assigned higher scores by the content relevance determination and scoring module 506. In some implementations, the method 300 during the filtering process in block 314 may still be able to include high quality multimedia items by degrading their size to a smaller size such that the quality of the items is not compromised and still look high quality to the user. For example, the content management server 434 may be capable of converting a 6 mb high quality image or video into a 500 kb size without degrading or compromising its quality and the method 300 during its filtering process in block 314 may thus not exclude that high quality image or video from the content or the entire corresponding content post. In some other implementations, if the method 300 determines that the streaming quality of the video would be poor for a particular network area, then the method 300 may filter the video out from the content. In yet some other implementations, the method 300 may simply filter out or exclude all the videos from the content and may just include text or small images. Various other methods for filtering content are also possible and contemplated.

Next, responsive to filtering the content by the filtering module 508, the method 300 may provide 316 filtered content for display on the client device of the user. Referring now to FIG. 3B, the method 300 continues by storing 322 items that were excluded from the content in the filtering process in block 314 in a queue. Storing the excluded items in the queue is advantageous as they may later be provided for display to the user when environment conditions (e.g., network quality, data plan availability) are improved. Next, the method 300 determines in block 324 whether the network quality has been improved since the last quality check and if it has not, then the method 300 wait 326 for a predetermined amount of time before it checks for network quality again in block 324. If on the other hand, the method 300 determines the network quality to be improved, then the method 300 may update 328 the content with one or more excluded items by retrieving those items from the queue and then provide 330 updated content for display on the client device of the user. For instance, the content provisioning module 510 may perform the operations in blocks 324-330 in cooperation with the network quality and data plan module 504 and the filtering module 508 as discussed elsewhere herein.

Figure 4:
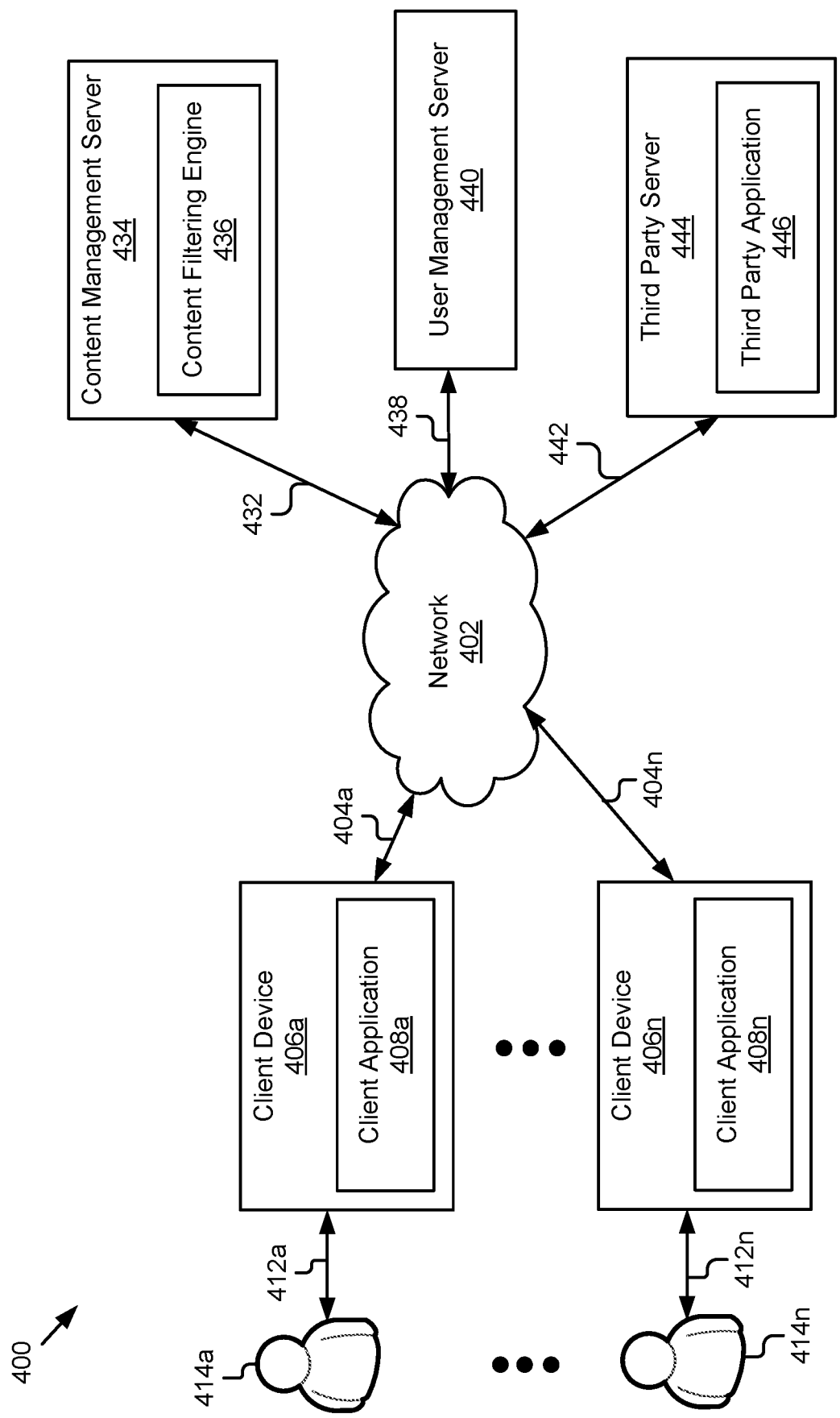
FIG. 4 is a block diagram illustrating an example system for filtering content based on network and data plan availability.

FIG. 4 is a block diagram illustrating an example system 400 for filtering content based on network and data plan availability. In the depicted implementation, the system 400 may include client devices 406a through 406n, a content management server 434, a user management server 440, and a third party server 444. In the illustrated implementation, these entities of the system 400 are communicatively coupled via network 402. However, the present disclosure is not limited to this configuration and a variety of different system environments and configurations may be employed and are within the scope of the present disclosure. Other implementations may include additional or fewer computing devices, services, and/or networks.

It should be recognized that FIG. 4 as well as the other figures used to illustrate an implementation, an indication of a letter after a reference number or numeral, for example, "406a" is a specific reference to the element or component that is designated by that particular reference numeral. In the event a reference numeral appears in the text without a letter following it, for example, "406," it should be recognized that such is a general reference to different implementations of the element or component bearing that general reference numeral.

In some implementations, the entities of the system 400 may use a cloud-based architecture where one or more computer functions or routines are performed by remote computing systems and devices at the request of a local computing device. For example, a client device 406 may be a computing device having hardware and/or software resources and may access hardware and/or software resources provided across the network 402 by other computing devices and resources, including, for instance, other client devices 406, the content management server 434, the user management server 440, and/or the third party server 444 or any other entities of the system 400.

The network 402 may be a conventional type, wired or wireless, and may have numerous different configurations including a star configuration, token ring configuration, or other configurations. Furthermore, the network 402 may include a local area network (LAN), a wide area network (WAN) (e.g., the Internet), and/or other interconnected data paths across which multiple devices may communicate. In some implementations, the network 402 may be a peer-to-peer network. The network 402 may also, be coupled to or includes portions of a telecommunications network for sending data in a variety of different communication protocols. In some implementations, the network 402 includes Bluetooth™ communication networks or a cellular communications network for sending and receiving data including via short messaging service (SMS), multimedia messaging service (MMS), hypertext transfer protocol (HTTP), direct data connection, WAP, email, etc. In addition, although FIG. 4 illustrates a single network 402 coupled to the client devices 406, the content management server 434, the user management server 440, and the third party server 444 that are illustrated, in practice, one or more networks 402 may be connected to these entities.

In some implementations, the client devices 406 (any or all of 406a through 406n) are computing devices having data processing and data communication capabilities. In the illustrated implementation, the users 414a through 414n interact with the client devices 406a and 406n, via signal lines 412a and 412n, respectively. The client devices 406a through 406n are communicatively coupled to the network 402 via signal lines 404a through 404n respectively. Although two client devices 406 are illustrated, the disclosure applies to a system architecture having any number of client devices 406 available to any number of users 414.

In some implementations, a client device 406 includes a workstation computer, a desktop computer, a laptop computer, a netbook computer, a tablet computer, a smartphone, a set-top box/unit, an Internet Protocol-connected smart TV including a computer processor capable of receiving viewer input, accessing video content on computer networks (e.g., the Internet), and executing software routines to provide enhanced functionality and interactivity to viewers, or the like. In some implementations, the client device 406 may be a handheld wireless computing device which may be capable of sending and receiving voice and/or data communications.

The client device 406 may include a computer processor, a memory, a power source, and a communication unit including one or more network interfaces for interacting with the network 402, including, for example, wireless transceivers to broadcast and receive network data via radio signals. The client device 406 may also include one or more of a graphics processor; a high-resolution touchscreen; a physical keyboard; forward and rear facing cameras; a Bluetooth® module; memory storing applicable firmware; and various physical connection interfaces (e.g., USB, HDMI, headset jack, etc.); etc.

Additionally, an operating system for managing the hardware and resources of the client device 406, application programming interfaces (APIs) for providing applications access to the hardware and resources, a user interface module for generating and displaying interfaces for user interaction and input, and applications including, for example, applications for web browsing, instant messaging with one or more other users through internet applications, and/or real-time video communication applications, etc., may be stored and operable on the client device 406. While FIG. 4 illustrates two or more client devices 406, the present disclosure applies to any system architecture having any number of client devices 406.

In some implementations, the client devices 406a through 406n contain client applications 408a through 408n, respectively (referred to herein individually and collectively as client application 408) executable by a processor 516 (see FIG. 5) of the client device 406 to provide for user interaction, and to send and receive data via the network 402. In particular, the client application 408 can be operable to instruct the client device 406 to render user interfaces, receive user input, and send information to and receive information from the content management server 434, the user management server 440, the third party server 444, and the other entities of the system 100. In these or other implementations, the client application 408 may be stored in memory 518 (see FIG. 5) of the client device 406 and is accessible and executable by a processor 516 (see FIG. 5).

The content management server 434 can be a hardware server that includes a processor (not shown), a memory (not shown), and network communication capabilities. The content management server 434 is coupled to the network 402 via signal line 432 for communication and cooperation with the other components of the system 400. In some implementations, the content management server 434 sends and receives data to and from one or more of the client devices 406a-406n, the user management server 440, and/or the third party server 444 via the network 402. Although one content management server 434 is shown, persons of ordinary skill in the art will recognize that multiple servers can be utilized, either in a distributed architecture or otherwise. For the purpose of this application, the system configuration and operations performed by the system are described in the context of a single content management server 434.

As depicted, the content management server 434 may include a content filtering engine 436 for filtering content based on level of network and data plan availability. In some implementations, the content filtering engine 436 may perform its operations described herein in cooperation with a client device 406. For instance, the content filtering engine 436 may receive the level of network and data plan availability from the client device 406 as an input and then perform its filtering operations thereon. The content filtering engine 436 may further perform its operations described herein in cooperation with the user management server 440. For instance, the content filtering engine 436 may retrieve user data (e.g., user content quality preferences, user's interests, user's social graph, user's calendar, user's prior interaction with the content, user average data plan usage, user's location, etc.) from the user management server 440 and perform its filtering taking the user data into consideration. It should be understood that the content filtering engine 436 is not limited to providing the above-noted services and may provide any other client or network-based service.

The user management server 440 can be a hardware server that includes a processor (not shown), a memory (not shown), and network communication capabilities. The user management server 440 is coupled to the network 402 via signal line 438 for communication and cooperation with the other components of the system 400. In some implementations, the user management server 440 sends and receives data to and from one or more of the client devices 406a-406n, the content management server 434, and/or the third party server 444 via the network 402. Although one user management server 440 is shown, persons of ordinary skill in the art will recognize that multiple servers can be utilized, either in a distributed architecture or otherwise. For the purpose of this application, the system configuration and operations performed by the system are described in the context of a single user management server 440.

Figure 6:
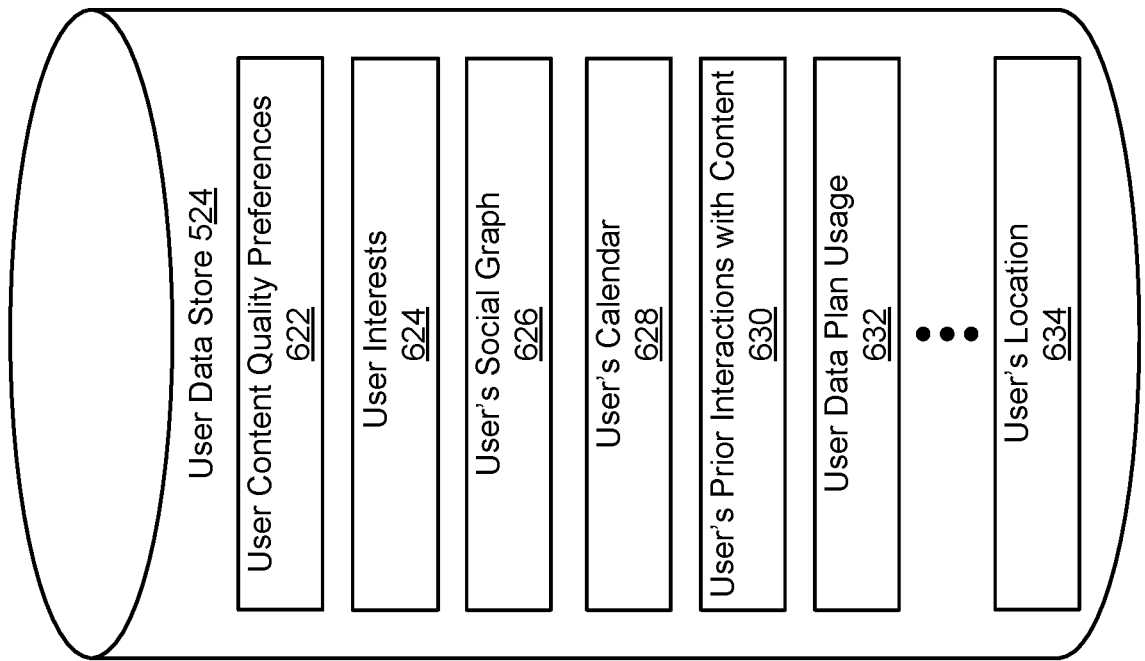
FIG. 6 depicts different types of data that are stored and used in this disclosure.
Figure 6:
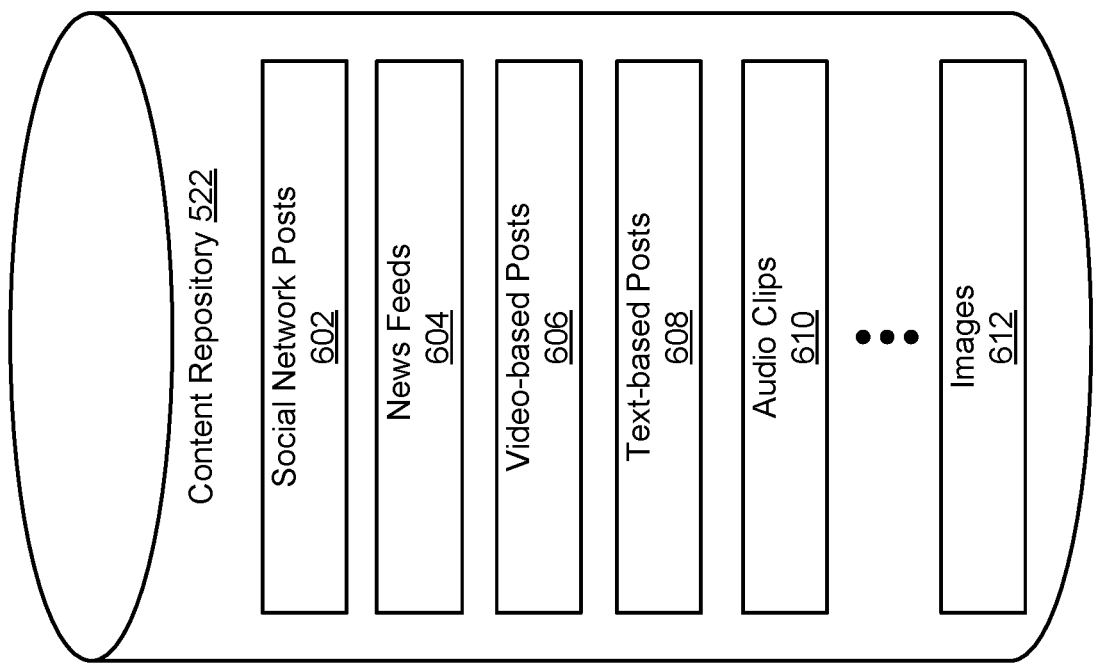

The user management server 440 is configured for maintaining user data in a non-transitory data store, for example, the user data store 524 as depicted in FIG. 6. In some implementations, the user management server 440 may formulate user data by automatically learning one or more online activities performed by a user via the network 402. In some other implementations, the user management server 440 may explicitly receive the user data defined by the user via the client device 406 and then store that data in the user data store 524. For instance, the user management server 440 may send a request to the client device 406 asking the user for one or more items as depicted in the user data store 524 (see FIG. 6) and upon receiving the one or more items, may store those items in the user data store 524.

The user data can be used during content filtering performed by the content management server 434. The user management server 440 may be communicatively coupled to the content management server 434 for sending and receiving data to and from the content management server 434. For instance, the user management server 440 may receive a request from the content management server 434, the request requesting for one or more items stored in user data store 524 and the user management server 440 may send the requested items to fulfill that request thereon. It should be understood that the user management server 440 is not limited to providing the above-noted services and may provide any other client or network-based service.

The third party server 444 includes one or more computing devices or systems for providing various computing functionalities, services, and/or resources to the other entities of the systems 400. The third party server 444 is coupled to the network 402 via signal line 442 for communication and cooperation with the other components of the system 400. In some implementations, the third party server 444 hosts a network-based software application (e.g., a third-party application 446) operable to provide computing functionalities, services and/or resources or functionalities, and to send data to and receive data from the other entities of the systems 400. In some implementations, the third party server 444 is a server, server array or any other computing device, or group of computing devices, having data processing, storing and communication capabilities. Examples of the types of software services that the third party server 444 including the third party application 446 may provide, but is not limited to, include third-party online gaming applications; internet searching; social networking; web-based email; blogging; micro-blogging; multimedia hosting, distribution, and sharing; business services; news and media distribution; or any combination of the foregoing services. It should be understood that the third party server 444 are not limited to providing the above-noted services and may include any other network-based or cloud-based service.

Figure 5:
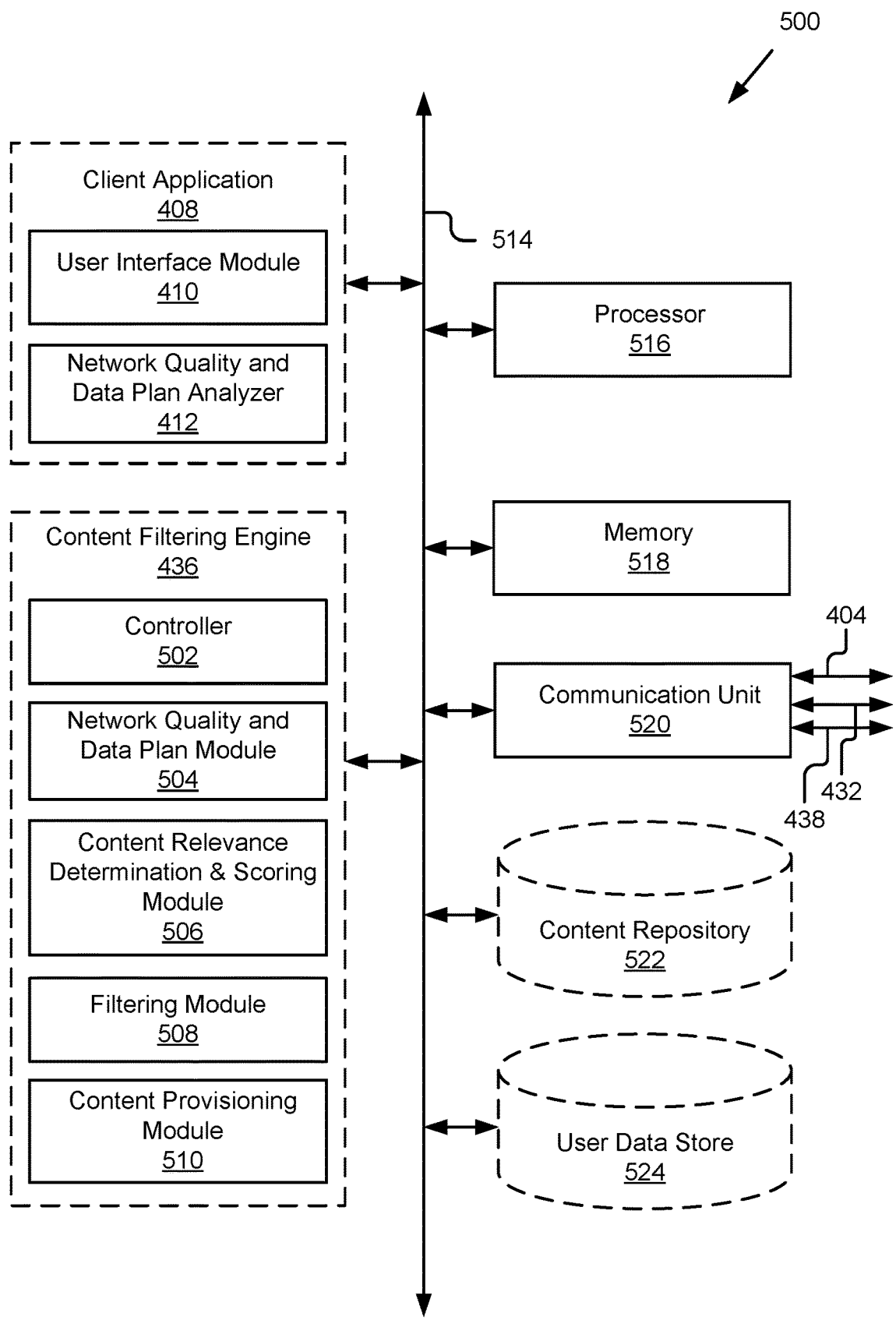
FIG. 5 is a block diagram illustrating an example computing device.

FIG. 5 is a block diagram of an example computing device 500, which may be representative of a computing device included in the content management server 434, the user management server 440, and/or the client device 406. As depicted, the computing device 500 may include a processor 516, a memory 518, a communication unit 520, a content repository 522, a user data store 524, and one or more of a client application 408, and a content filtering engine 436, which may be communicatively coupled by a communication bus 514.

Depending upon the configuration, the computing device 500 may include differing components. For instance, in a content management server-side implementation, the computing device 500 may include the processor 516, the memory 518, the communication unit 520, the content filtering engine 436, and the content repository 522. In an example user management server-side implementation, the computing device 500 may include the components 516, 518, 520, and the user data store 524. In an example client-side implementation, the computing device 500 may include the components 516, 518, 520, and the client application 408. It should be understood that the above configurations are provided by way of example and numerous further configurations are contemplated and possible.

The processor 516 may execute software instructions by performing various inputs, logical, and/or mathematical operations. The processor 516 may have various computing architectures to method data signals including, for example, a complex instruction set computer (CISC) architecture, a reduced instruction set computer (RISC) architecture, and/or an architecture implementing a combination of instruction sets. The processor 516 may be physical and/or virtual, and may include a single core or plurality of processing units and/or cores. In some implementations, the processor 516 may be capable of generating and providing electronic display signals to a display device, supporting the display of images, capturing and transmitting images, performing complex tasks including various types of feature extraction and sampling, etc. In some implementations, the processor 516 may be coupled to the memory 518 via the bus 514 to access data and instructions therefrom and store data therein. The bus 514 may couple the processor 516 to the other components of the computing device 500 including, for example, the client application 408, the content filtering engine 436, the memory 518, the communication unit 520, the content repository 522, and/or the user data store 524.

The memory 518 may store and provide access to data to the other components of the computing device 500. In some implementations, the memory 518 may store instructions and/or data that may be executed by the processor 516. The memory 518 is also capable of storing other instructions and data, including, for example, an operating system, hardware drivers, other software applications, databases, etc. The memory 518 may be coupled to the bus 514 for communication with the processor 516 and the other components of the computing device 500.

The memory 518 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 5216. In some implementations, the memory 518 may include one or more of volatile memory and non-volatile memory (e.g., RAM, ROM, hard disk, optical disk, etc.). It should be understood that the memory 518 may be a single device or may include multiple types of devices and configurations.

The bus 514 can include a communication bus for transferring data between components of a computing device or between computing devices, a network bus system including the network 402 or portions thereof, a processor mesh, a combination thereof, etc. In some implementations, the client application 408 and the content filtering engine 436 may cooperate and communicate via a software communication mechanism implemented in association with the bus 514. The software communication mechanism can include and/or facilitate, for example, inter-process communication, local function or procedure calls, remote procedure calls, network-based communication, secure communication, etc.

The communication unit 520 may include one or more interface devices for wired and wireless connectivity with the network 402 and the other entities and/or components of the system 400 including, for example, the client devices 406, the content management server 434, the user management server 440, the content repository 522, and the user data store 524, etc. For instance, the communication unit 520 may include, but is not limited to, CAT-type interfaces; wireless transceivers for sending and receiving signals using Wi-Fi™; Bluetooth®, cellular communications, etc.; USB interfaces; various combinations thereof; etc. The communication unit 520 may be coupled to the network 402 via the signal lines 404, 432, and 438. In some implementations, the communication unit 520 can link the processor 516 to the network 402, which may in turn be coupled to other processing systems. The communication unit 520 can provide other connections to the network 402 and to other entities of the system 400 using various standard communication protocols, including, for example, those discussed elsewhere herein.

The content repository 522 and user data store 524 are information sources for storing and providing access to data. In some implementations, the content repository 522 and the user data store 524 may be coupled to the components 516, 518, 520, 408, and/or 436 of the computing device 500 via the bus 514 to receive and provide access to data. In some implementations, the content repository 522 and user data 524 may store data received from the other entities 406, 434, and/or 440 of the system 400, and provide data access to these entities. The content repository 522 and the user data store 524 can each include one or more non-transitory computer-readable mediums for storing the data. In some implementations, the content repository 522 and the user data store 524 may be incorporated with the memory 518 or may be distinct therefrom. In some implementations, the content repository 522 and the user data store 524 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

Referring now to FIG. 6, the content repository 522 may include, for example and without limitation, social networks posts 602, web/news feeds 604, video-based posts 606, text-based posts 608, audio clips 610, and/or images 612. The social networks posts 602 include posts made by a user regarding various topics on a social network. The web/news feeds 604 include data, such as news articles, journals, status updates, photos, videos, web links, and endorsements regarding people and/or topics of interest that a user follows. The video-based posts 606 include posts embedding videos by a user on a social network. The text-based posts 608 are posts made by a user that only include texts and not any multimedia (e.g., audio, video, photo, etc.). Audio clips 610 include audio content, such as songs, radio, audio lectures, keynotes, etc. present on the Internet. Images 612 include graphical content present on the Internet.

The user data store 524, as depicted for example in FIG. 6, may include, without limitation, user content quality preferences 622, user interests 624, user's social graph 626, user's calendar 628, user's prior interactions with content 630, user data plan usage 632, and/or user's location 634. The user content quality preferences 622 include user preferences for quality of content at different environment conditions (e.g., good/poor network availability, high/low data plan availability, etc.). For example, the user content quality preferences 622 may describe, for a particular user, whether the user wants high or low quality content when the network condition is poor. User interests 624 may describe for a plurality of users their interests or likes in various activities, topics, content (e.g., movies, songs, etc.), food, and other people. The user's social graph 626 defines one or more users with whom a particular user shares a relationship or an affinity on a social network. The one or more users can be friends of the particular user on the social network. The user's calendar 628 includes one or more events or notes marked up by a user as a reminder or as a description for a particular date/time. The user's prior interaction with content 630 include date and time stamps of user interactions with a particular content, such as a video, an audio, an image, a message, a social network post, etc. The user's data plan usage 632 describes usage statistics of a data plan associated with a user. For example, the usage statistics may indicate that the user used 1.5 GB of his/her data plan for a particular month while only 1 GB in the subsequent month. The user's location 634 describes current or previous locations from where the content was or is currently being requested or accessed.

Returning back to FIG. 5, as depicted, the client application 408 includes a user interface module 410 and a network quality and data plan analyzer 412. The components 410 and 412 of the client application 408 are coupled for communication with each other and the other components 502, 504, 506, 508, 510, 516, 518, 520, 522, and 524 of the computing device 500. The components 410 and 412 are also coupled to the network 402 via the communication unit 520 for communication with the other entities of the system 400.

In some implementations, the user interface module 410 and the network quality and data plan analyzer 412 are sets of instructions executable by the processor 516 to provide their respective acts and/or functionality. In other implementations, the user interface module 410 and the network quality and data plan analyzer 412 are stored in the memory 518 of the computing device 500 and are accessible and executable by the processor 516 to provide their respective acts and/or functionality. In any of these implementations, the user interface module 110 and the network quality and data plan analyzer 412 may be adapted for cooperation and communication with the processor 516 and other components 502, 504, 506, 508, 510, 518, 520, 522, and 524 of the computing device 500.

The user interface module 410 may be software including routines for receiving one or more user inputs, sending the one or more user inputs to the content filtering engine 436 for processing, and displaying results of the processing to the user. The one or more user inputs may include a request for content, a response to a notification notifying the user of whether to filter the content based on level of network and data plan availability or to just wait and load the entire content, a user preference for filtering the content at certain network quality and/or data plan availability, etc. Responsive to receiving one or more inputs, the user interface module 410 may send the one or more inputs to an appropriate component of the content filtering engine 436 for processing. For instance, the user interface module 410 may be communicatively coupled to the controller 502 of the content filtering engine 436 to send the one or more inputs and the controller 502 may then pass those inputs to an appropriate component of the content filtering engine 436 for further processing thereon. Once the one or more inputs are processed, the user interface module 410 may receive the results of the processing from the content filtering engine 436 and may then provide those results for display to the user on a client device, such as the client device 406.

The network quality and data plan analyzer 412 may be software including routines for analyzing a network quality and data plan availability associated with a client device of a user. In some implementations, analyzing the network quality includes determining a level of network availability associated with the client device of the user. The level of network availability is an indication of whether the quality of the network is good or poor. For example, a good quality network can be a high quality Wi-Fi network while a poor quality network can be a 1 bar Edge network.

In some implementations, analyzing the data plan availability includes determining an amount of data plan that is left with the user before overage and time left before the current billing cycle period ends. By way of a non-limiting example, the user may be subscribed to a 2 GB data plan out of which 1.5 GB has been used in 25 days in the current billing cycle period that includes 31 days, then analyzing the data plan availability in this particular example includes determining that 500 MB is left with the user for usage in the next 6 days.

In some implementations, the network quality and data plan analyzer 412 may perform its operations described herein in response to receiving a request from the content filtering engine 436. For instance, the network quality and data plan analyzer 412 may receive a request to analyze the network quality and data plan availability associated with a client device of a user from the network quality and data plan module 504 of the content rendering engine 436. Responsive to processing the request, the network quality and data plan analyzer 412 may send the result of the analysis back to the content filtering engine 436 to perform its further acts and/or functionalities thereon. Other variations are also possible and contemplated.

As depicted, the content filtering engine 436 includes a controller 502, a network quality and data plan module 504, a content relevance determination and scoring module 506, a filtering module 508, and a content provisioning module 510. The components 502, 504, 506, 508, and 510 of the content filtering engine 436 are coupled for communication with each other and the other components 408, 410, 412, 516, 518, 520, 522, and 524 of the computing device 500. The components 502, 504, 506, 508, and 510 are also coupled to the network 402 via the communication unit 520 for communication with the other entities of the system 400.

In some implementations, the controller 502, the network quality and data plan module 504, the content relevance determination and scoring module 506, the filtering module 508, and the content provisioning module 510 are sets of instructions executable by the processor 516 to provide their respective acts and/or functionality. In other implementations, the controller 502, the network quality and data plan module 504, the content relevance determination and scoring module 506, the filtering module 508, and the content provisioning module 510 are stored in the memory 518 of the computing device 500 and are accessible and executable by the processor 516 to provide their respective acts and/or functionality. In any of these implementations, the controller 502, the network quality and data plan module 504, the content relevance determination and scoring module 506, the filtering module 508, and the content provisioning module 510 may be adapted for cooperation and communication with the processor 516 and other components 408, 410, 412, 518, 520, 522, and 524 of the computing device 500.

The controller 502 may be software including routines for exchanging data between one or more components of the client device 408 and the content filtering engine 426. For instance, the controller 502 may act as a medium for receiving one or more inputs from a component of the client device 408 (e.g., the user interface module 410) and sending the one or more inputs to a respective component of the content filtering engine 426 for processing. In some implementations, responsive to the processing, the controller 502 is further configured to send the results of the processing back to the one or more components of the client device 408 for performing their acts and/or functionalities thereon. By way of example, the controller 502 may receive, from the user interface module 410, a user input approving filtering of content based on level of network and/or data plan availability and send the user input to the network quality and data plan module 504 to initiate the filtering process. Once the content is filtered, the controller 502 may send filtered content to the user interface module 410 for display to the user thereon.

The network quality and data plan module 504 may be software including routines for determining a level of network and data plan availability associated with a user. In some implementations, the network and data plan module 504 may determine the level of network and data plan availability in cooperation with the network quality and data plan analyzer 412. For instance, the network quality and data plan module 504 may send, via the controller 502, a request to the network quality and data plan analyzer 412 of the client application 408 to analyze the network quality associated with a client device of the user and the data plan availability associated with user's account, and the network quality and data plan analyzer 412 may then perform its analysis to determine the level of network and data plan availability and send the results of its analysis to the network and data plan module 504 as a response to that request.

Upon receiving the level of network quality and data plan availability, the network quality and data plan module 504 may determine whether the network quality is good/poor and whether the data plan usage is beyond a certain threshold. The certain threshold may be a predetermined usage value or may be dynamically determined based on amount of data plan left with the user and number of days left in the current billing cycle period. If the network quality and data plan module 504 determines the network quality as poor and/or the data plan usage beyond the certain threshold, then the network quality and data plan module 504 may decide that content requested by user should be filtered as per the network quality and/or amount of data plan left. In some implementations, the network quality and data plan module 504 may send, via the controller 504, a notification of this content filtering to the user interface module 410 asking user's approval for filtering the content. Based on user's response, the network quality and data plan module 504 may signal an appropriate component of the content filtering engine 436 to perform the subsequent set of operations thereon. For instance, if the user's response indicates an approval for content filtering, then the network quality and data plan module 504 may signal the content relevance determination and scoring module 506 to perform its acts and/or functionalities described herein. If on the other hand, the user's response indicates a denial for content filtering and instead just wants to wait and load the entire content, then the network quality and data plan module 504 may signal the content provisioning module 510 to simply provide the requested content to the user without any filtration.

The content relevance determination and scoring module 506 may be software including routines for determining relevance of content requested by user. The content may include one or more items (e.g., text-based posts, video-based posts, audio clips, photos, etc.) and determining the relevance of the content may include, in some instances, determining relevance of each item in the content based on one or more factors. The one or more factors may include, for example and without limitation, user interests, user's current location or environment from where the content is being accessed, user's affinity to other users to which an item in the content is related, user's calendar signifying one or more events related to an item in the content at a particular time, type and size of an item (e.g., whether the item includes short text or long text, a video, an image, an audio, etc.), user's prior level of engagement with an item in the content, and average data plan usage of the requesting user.

In some implementations, the content relevance determination and scoring module 506 may retrieve the one or more factors for content relevance determination, as discussed above, from the user data store 524 (see FIG. 6) of the user management server 440. For instance, the user data store 524 may include user content quality preferences 622, user interests 624, user's social graph 626, user's calendar 628, user's prior interactions with content 630, user's data plan usage 632, and the user's location 634, and the content relevance determination module 506 may determine the relevance of the content based thereon.

Once the relevance of each item in the content is determined, the content relevance determination and scoring module 506 may then compute an inclusion score for the item based on the relevance associated with the item, the level of network quality, and/or the level of data plan availability. The inclusion score for an item may be an indication of how important or relevant an item in content is to the user requesting the content. In some instances, the inclusion score for an item can be any numeric value, where a high numeric inclusion score value indicates a highly relevant item to a user while a low numeric inclusion score value indicates an item of lower or no interest to the user. Responsive to assigning an inclusion score to each item in the content, the content relevance determination and scoring module 506 may then send the inclusion scores to the filtering module 510 to perform its acts and/or functionalities thereon. In some implementations, the content relevance determination and scoring module 506 may also store the inclusion scores in a data store for later retrieval and/or access by the client application 408 and/or the content filtering engine 436.

The filtering module 508 may be software including routines for filtering content according to a level of network quality and data plan availability. In some implementations, filtering the content includes filtering or excluding out one or more items from the content based on an inclusion score associated with each item. The filtering module 508 may receive an inclusion score for an item from the content relevance determination and scoring module 506 as discussed elsewhere herein.

To filter the content, the filtering module 508 may compare an inclusion score for each item in content with a predetermined threshold score. For instance, the filtering module 508 may compare an inclusion score for an item with the threshold score to decide whether to include or exclude the item from the content for provisioning to the user. If the inclusion score for the item is less than the threshold score, the filtering module 508 may exclude the item. Otherwise, the filtering module 508 may decide to keep or include the item in the content.

In some implementations, the filtering module 508 may further be configured to maintain a queue of items that were excluded during the filtering process as discussed above. Maintaining this queue of excluded items is advantageous as these items can be later provided for display to a user when network and/or data plan conditions are better. Once content filtering and maintaining the queue of excluded items in the queue is done by the filtering module 508, the filtering module 508 may then send filtered content and the queue of excluded items to the content provisioning module 510 for provisioning to the user thereon.

The content provisioning module 510 may be software including routines for providing content for display to a user. The content provided for display may be filtered content or content requested by user without any filtration. In some implementations, the content provisioning module 510 may perform its functionalities described herein in response to receiving a signal from the filtering module 508 or the network quality and data plan module 504. For instance, the signal received from the filtering module 508 may indicate providing content filtered by the filtering module 508 for display to a user that requested the content and approved for content filtering. The signal received from the network quality and data plan module 504 may indicate providing content without any filtration for display to the requesting user as discussed elsewhere herein. Responsive to receiving the signal from the filtering module 508 or the network quality and data plan module 504, the content provisioning module 510 may send the filtered content or the content without filtration to the user interface module 410, which then display the content on a client device 406 associated with the user.

It should be understood that the content provisioning module 510 is not limited to providing the content based on the signals as discussed above and that other variations are also possible and contemplated. For example, the content provisioning module 510 may receive, via the controller 502, a user request for content from the user interface module 410 directly and responsive to receiving the request, the content provisioning module 510 may retrieve the requested content from the content repository 522 and send, via the controller 502, the retrieved content to the user interface module 410, which then display the content on a client device 406 associated with the user.

In some implementations, the content provisioning module 510 may further be configured to provide items that were excluded during filtering process by the filtering module 508 to a user when environment conditions (e.g., network quality, data plan availability) are better. For instance, during the provisioning of filtered content to the user interface module 410 for display purposes, the content provisioning module 510 may also send a notification notifying the user whether he/she wants to retrieve the excluded items in the content at a later time when the environment conditions are better. Based on the user's approval to the notification, the content provisioning module 510 may periodically check with the network quality and data plan module 504 to determine the environment conditions and once they are determined to be improved, may send, via the controller 502, the excluded items to the user interface module 410 for displaying them on the client device 406 of the user thereon.

Additional structure, acts, and/or functionality of the user interface module 410, the network quality and data plan analyzer 412, the controller 502, the network quality and data plan module 204, the content relevance determination and scoring module 506, the filtering module 508, and the content provisioning module 510 are further described above with respect to at least FIGS. 1, 2A-2C, and 3A-3B.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
    receiving a request for content from a mobile device, wherein the content comprises a first set of content items;
    determining a first network quality value of a wireless network;
    determining, based on the first network quality value, a score for each content item in the first set of content items;
    filtering, based on the scores for the first set of content items, a subset of content items from the first set of content items to obtain a second set of content items;
    determining a second network quality value of the wireless network;
    determining that wireless network quality has improved based on the second network quality value exceeding the first network quality value;
    in response to determining that the wireless network quality has improved, determining, based on the second network quality value, an updated score for each content item in the subset of content items;
    selecting, from among the subset of content items and based on the updated scores, one or more content items to be included with the second set of content items; and
    providing, for output on the mobile device, the second set of content items in response to the request.

2. The method of claim 1, wherein one or more previously-filtered content items were previously filtered at one or more content provisioning servers that service the mobile device.

3. The method of claim 1, wherein the content items are social media posts.

4. The method of claim 1, wherein the previously-filtered content items were filtered after the previous network quality check, and wherein the previously-filtered content items are rescored based on determining that the quality of the wireless network has improved since the previous network quality check.

5. The method of claim 1, wherein the previously-filtered content items comprise multimedia items of a predetermined size or larger.

6. A system comprising:
    receiving a request for content from a mobile device, wherein the content comprises a first set of content items;

determining a first network quality value of a wireless network;

determining, based on the first network quality value, a score for each content item in the first set of content items;

filtering, based on the scores for the first set of content items, a subset of content items from the first set of content items to obtain a second set of content items;

determining a second network quality value of the wireless network;

determining that wireless network quality has improved based on the second network quality value exceeding the first network quality value;

in response to determining that the wireless network quality has improved, determining, based on the second network quality value, an updated score for each content item in the subset of content items;

selecting, from among the subset of content items and based on the updated scores, one or more content items to be included with the second set of content items; and providing, for output on the mobile device, the second set of content items in response to the request.

7. The system of claim 6, wherein one or more previously-filtered content items were previously filtered at one or more content provisioning servers that service the mobile device.

8. The system of claim 6, wherein the content items are social media posts.

9. The system of claim 6, wherein the previously-filtered content items were filtered after the previous network quality check, and wherein the previously-filtered content items are rescored based on determining that the quality of the wireless network has improved since the previous network quality check.

10. The system of claim 6, wherein the previously-filtered content items comprise multimedia items of a predetermined size or larger.

11. A non-transitory computer readable medium having stored therein instructions, that when executed by a computing system, cause the computing system to perform functions comprising:

receiving a request for content from a mobile device, wherein the content comprises a first set of content items;

determining a first network quality value of a wireless network;

determining, based on the first network quality value, a score for each content item in the first set of content items;

filtering, based on the scores for the first set of content items, a subset of content items from the first set of content items to obtain a second set of content items;

determining a second network quality value of the wireless network;

determining that wireless network quality has improved based on the second network quality value exceeding the first network quality value;

in response to determining that the wireless network quality has improved, determining, based on the second network quality value, an updated score for each content item in the subset of content items;

selecting, from among the subset of content items and based on the updated scores, one or more content items to be included with the second set of content items; and providing, for output on the mobile device, the second set of content items in response to the request.

12. The medium of claim 11, wherein one or more previously-filtered content items were previously filtered at one or more content provisioning servers that service the mobile device.

13. The medium of claim 11, wherein the content items are social media posts.

14. The medium of claim 11, wherein the previously-filtered content items were filtered after the previous network quality check, and wherein the previously-filtered content items are rescored based on determining that the quality of the wireless network has improved since the previous network quality check.

* * * * *